United States Patent
Bukovitz

(10) Patent No.: US 8,875,350 B2
(45) Date of Patent: Nov. 4, 2014

(54) EXTENSION POLE WITH REVERSIBLE TIP ASSEMBLY

(71) Applicant: The Wooster Brush Company, Wooster, OH (US)

(72) Inventor: Richard K. Bukovitz, Orrville, OH (US)

(73) Assignee: The Wooster Brush Company, Wooster, OH (US)

( * ) Notice: Subject to any disclaimer, the term of this patent is extended or adjusted under 35 U.S.C. 154(b) by 0 days.

(21) Appl. No.: 13/914,673

(22) Filed: Jun. 11, 2013

(65) Prior Publication Data

US 2014/0000065 A1 Jan. 2, 2014

Related U.S. Application Data

(60) Provisional application No. 61/666,217, filed on Jun. 29, 2012.

(51) Int. Cl.
*B25G 3/00* (2006.01)
*B25G 3/18* (2006.01)
*C08L 53/00* (2006.01)
*B25G 3/36* (2006.01)
*B25G 1/04* (2006.01)

(52) U.S. Cl.
CPC .. *B25G 3/00* (2013.01); *B25G 3/18* (2013.01); *C08L 53/00* (2013.01); *B25G 3/36* (2013.01); *B25G 1/04* (2013.01)
USPC ................................ 16/429; 16/427; 16/436

(58) Field of Classification Search
USPC ........... 16/429, 427, 422, 405, 436; 81/177.1, 81/177.2, 489; 15/143.1, 144.1, 159.1, 15/235.8, 236.3; 294/57, 19.1, 19.2, 19.3; 403/107, 109.1, 109.4, 377, 321
See application file for complete search history.

(56) References Cited

U.S. PATENT DOCUMENTS

| | | | | |
|---|---|---|---|---|
| 4,758,023 A * | 7/1988 | Vermillion | ...................... | 285/7 |
| 5,288,161 A | 2/1994 | Graves et al. | | |
| 5,375,286 A * | 12/1994 | Harrah | .................... | 15/147.1 |
| 5,385,420 A * | 1/1995 | Newman et al. | .............. | 403/299 |
| 5,682,641 A * | 11/1997 | Newman et al. | ................. | 16/429 |
| 6,029,308 A * | 2/2000 | Smith | ............................ | 15/229.2 |
| 6,671,930 B2 * | 1/2004 | Lanz | ............................... | 16/429 |
| 6,874,201 B2 * | 4/2005 | Ta et al. | ........................ | 16/429 |
| 6,952,862 B2 * | 10/2005 | Axelsson | ........................ | 16/422 |
| 7,549,195 B2 * | 6/2009 | Bensussan et al. | ............. | 16/429 |
| 7,721,391 B2 | 5/2010 | Bukovitz et al. | | |
| 8,186,012 B2 | 5/2012 | Mann | | |

* cited by examiner

*Primary Examiner* — Chuck Mah
(74) *Attorney, Agent, or Firm* — Renner, Otto, Boisselle & Sklar, LLP

(57) ABSTRACT

A reversible tip assembly for selectively connecting an extension pole/handle extension to tool handles having either compatible quick release lock mechanisms or conventional internally threaded sockets. The tip assembly comprises a body having oppositely extending rod-like tips at opposite ends of the body. One of the tips has a plurality of circumferentially spaced axially extending external thread segments. The other tip has an end portion that is compatible with quick release lock mechanisms.

7 Claims, 4 Drawing Sheets

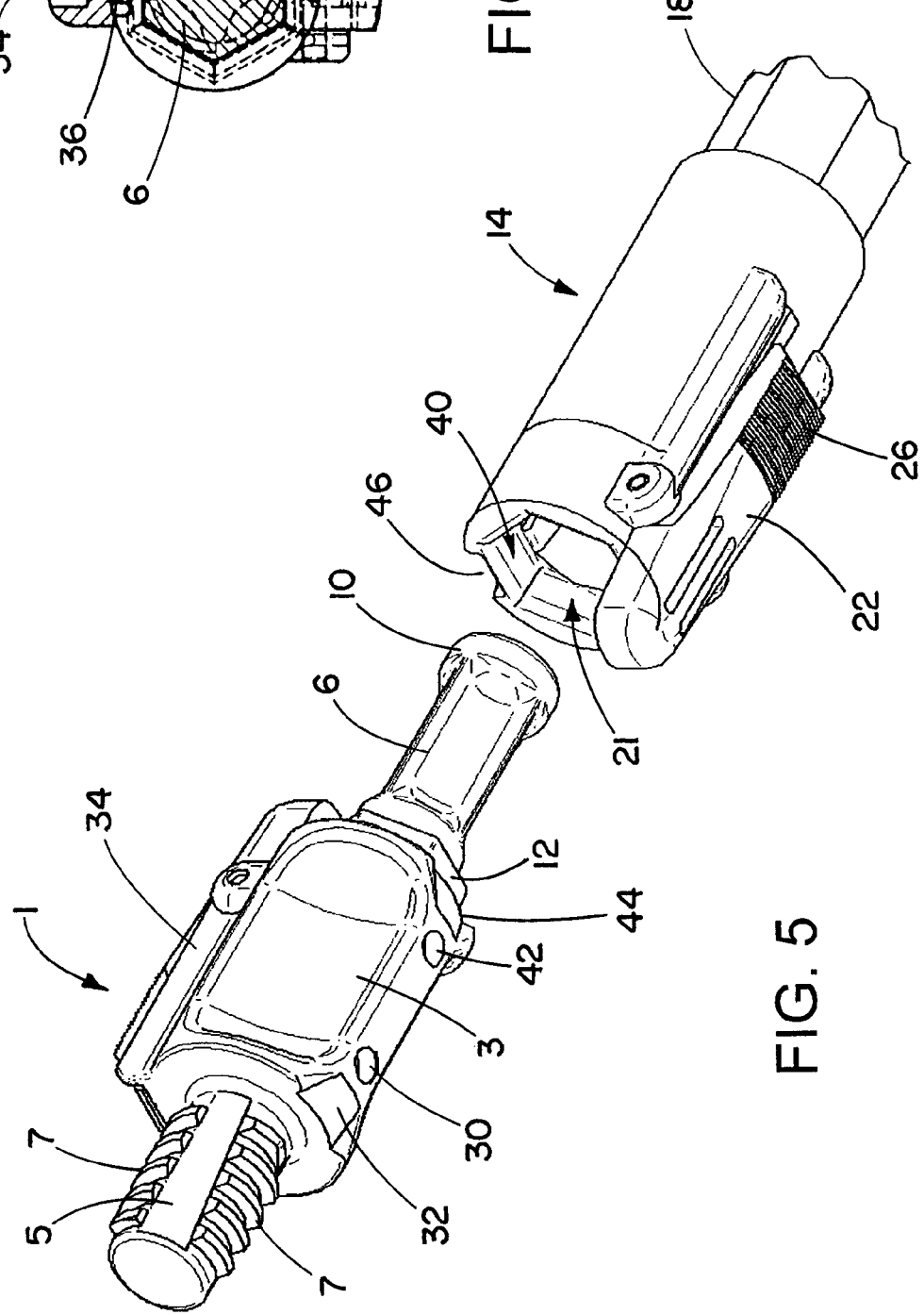

EXTENSION POLE WITH REVERSIBLE TIP ASSEMBLY

CROSS-REFERENCE TO RELATED APPLICATIONS

This application claims the benefit of U.S. Provisional Application Ser. No. 61/666,217, filed Jun. 29, 2012, the entire disclosure of which is incorporated herein by reference.

FIELD OF THE INVENTION

This invention relates to an extension pole with reversible tip assembly for selectively connecting the extension pole to tool handles having either compatible quick release lock mechanisms or conventional internally threaded sockets.

SUMMARY OF THE INVENTION

The reversible tip assembly may be used to releasably connect extension poles/handle extensions to tool handles having either compatible quick release lock mechanisms or conventional internally threaded sockets.

In accordance with one aspect of the invention, the reversible tip assembly comprises a body having oppositely axially extending rod-like tips at opposite ends thereof. Either of the tips may be used to removably connect the tip assembly to an extension pole/handle extension, and the other tip may be used to releasably connect the extension pole/handle extension to tool handles having either compatible quick release lock mechanisms or conventional internally threaded sockets.

In accordance with another aspect, one of the tips has a plurality of circumferentially spaced axially extending external thread segments that may either be fitted into mating pockets in a socket in a female adaptor assembly (pole adaptor) fixedly attached to the outer end of the extension pole/handle extension to prevent relative rotation therebetween, or used to threadedly connect the extension pole/handle extension to tool handles having conventional internally threaded sockets.

In accordance with another aspect, the other tip may have a cylindrical outer end portion for engaging a bearing support in either the pole adaptor socket or tool handles having compatible quick release lock mechanisms, and a non-cylindrical shaped flange adjacent the inner end of the other tip for seated engagement in a correspondingly shaped recess adjacent the axial outer end of either the pole adaptor socket or a socket in the tool handles to prevent relative rotation therebetween.

In accordance with another aspect, a releasable latch prevents whichever tip is seated within the pole adaptor socket from being withdrawn therefrom until released.

In accordance with another aspect, another releasable latch prevents the other tip from being withdrawn from tool handle sockets having compatible quick release lock mechanisms when fully seated therein until released.

BRIEF DESCRIPTION OF THE DRAWINGS

FIG. 5 is a perspective view of the reversible tip assembly and extension pole with pole adaptor of FIG. 4.

FIG. 6 is a transverse section through the other tip of the reversible tip assembly of FIG. 4 taken on the plane of the line 6-6 thereof.

DETAILED DESCRIPTION

Figure 1:
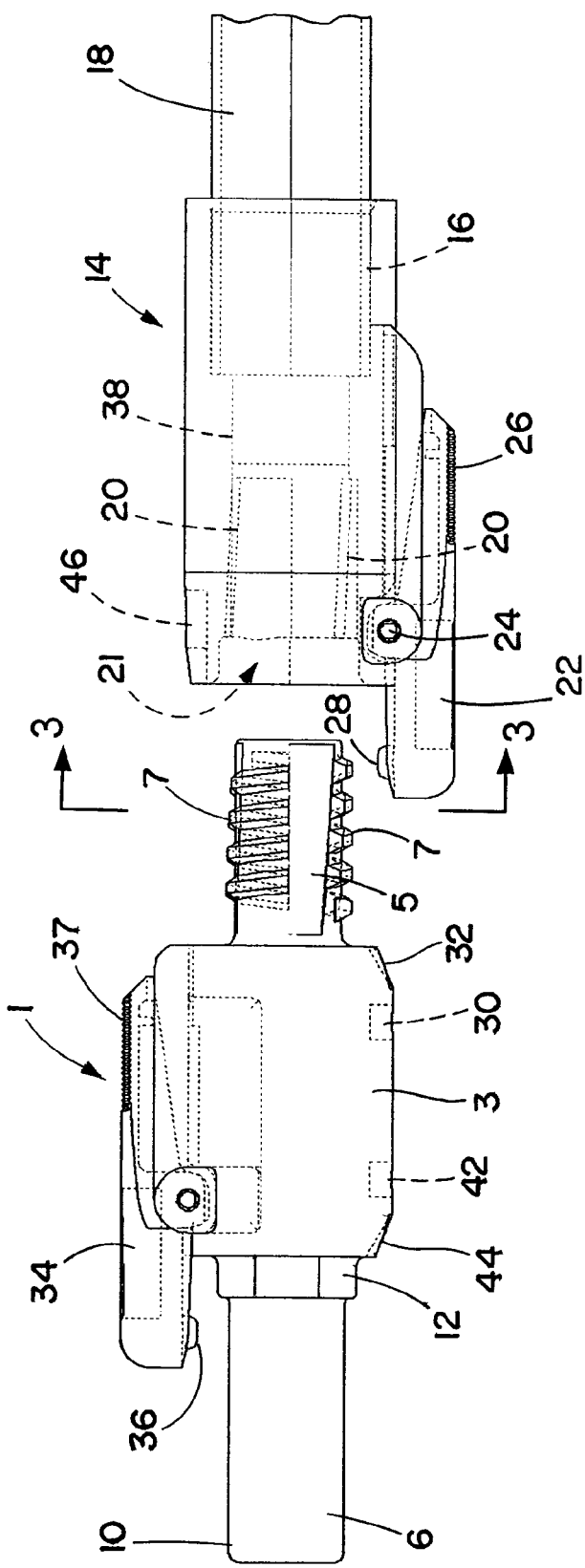
FIG. 1 is a side elevation view of one form of female adaptor assembly (pole adaptor) fixedly attached to an end portion of an extension pole/handle extension and reversible tip assembly having oppositely axially extending rod-like tips at opposite ends of the tip assembly body oriented for inserting one of the tips into the pole adaptor socket.
Figure 3:
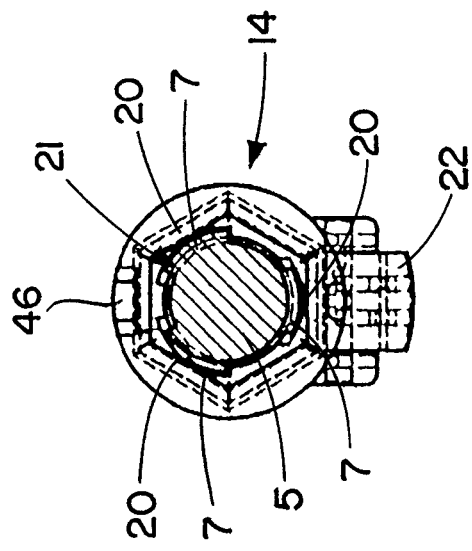
FIG. 3 is a transverse section through the one tip of the reversible tip assembly of FIG. 1 taken on the plane of the line 3-3 thereof.
Figure 2:
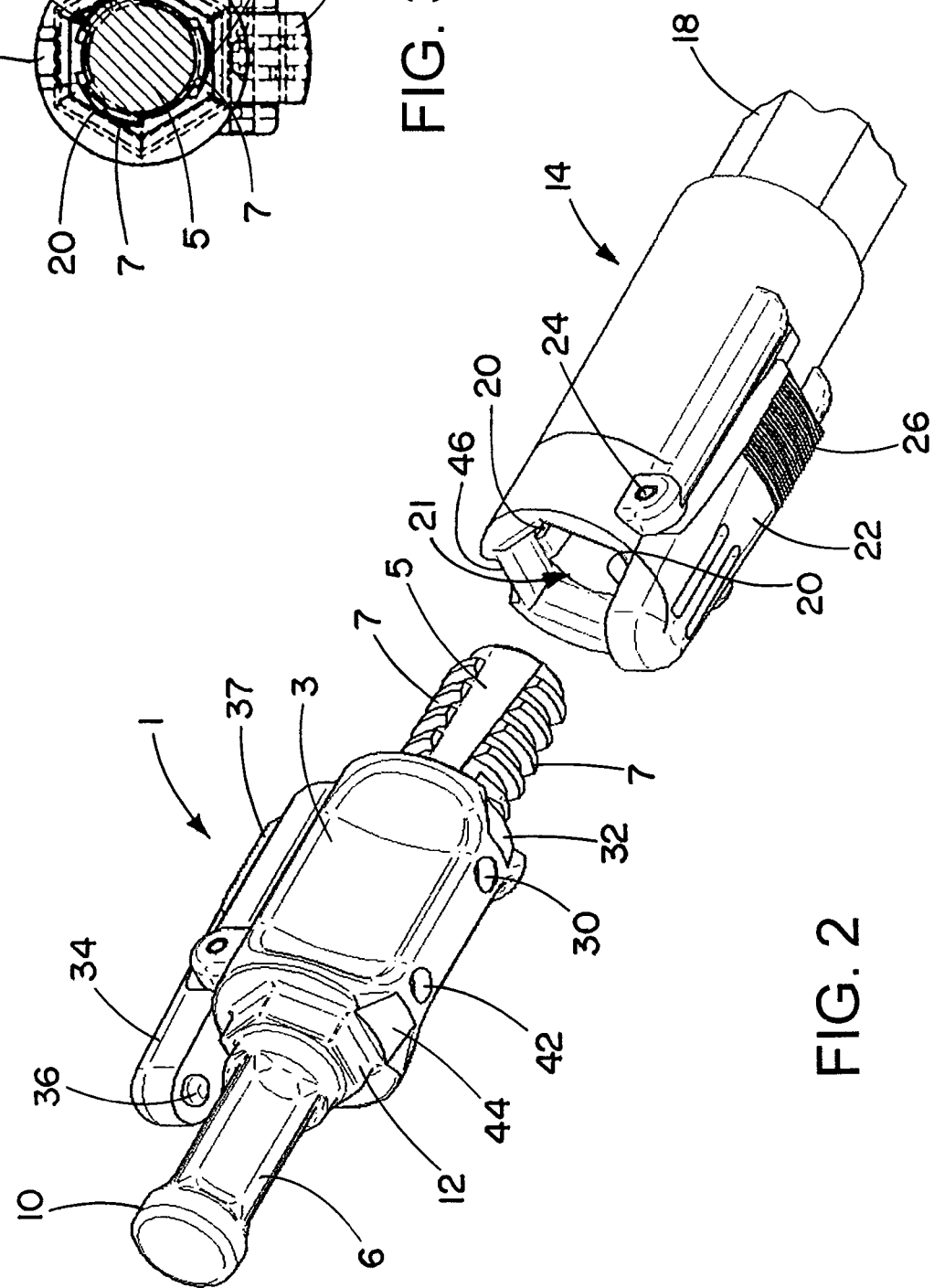
FIG. 2 is a perspective view of the reversible tip assembly and extension pole with pole adaptor of FIG. 1.

Referring to the drawings, and initially to FIGS. 1-3, there is shown one form of reversible tip assembly 1 in accordance with the present invention which comprises a body 3 having oppositely axially extending rod-like tips 5, 6 at opposite ends thereof. One of the tips 5 has two or more (in this example three) circumferentially spaced external thread segments 7 extending axially along the length thereof. The other tip 6 has a cylindrical outer end portion 10 and a non-cylindrical shaped flange 12 (for example a hex shape) at the axial inner end thereof. Either tip 5 or 6 may be used to non-rotatably connect the tip assembly 1 to a female adaptor assembly (pole adaptor) 14 fixedly attached to an end portion 16 of an extension pole/handle extension 18 and the other tip 6 or 5 may be used to releasably connect the extension pole/handle extension to tool handles (not shown) having either compatible quick release lock mechanisms or conventional internally threaded sockets as described hereafter.

The thread segments 7 of tip 5 may be axially inserted/fitted into mating axially extending pockets 20 in a socket 21 in the pole adaptor 14 (see FIGS. 2 and 3) to prevent relative rotation therebetween. Cooperating latch members are provided on the pole adaptor 14 and reversible tip assembly 1 to releasably retain the tip assembly and pole adaptor together with the tip thread segments 7 fully inserted into the pole adaptor pockets 20.

In the embodiment disclosed herein, the latch member comprises a locking lever 22 pivotally connected immediate its ends to the pole adaptor 14. One end of the locking lever 22 extends rearwardly from the pivot 24 to provide a thumb engaging portion 26. The other end of the locking lever 22 extends forwardly of the pivot 24 beyond the outer end of the pole adaptor, and has a locking pin 28 (see for example FIG. 1) extending radially inwardly from the outer end of the locking lever for pivotal movement with the locking lever into and out of engagement with a hole or recess 30 in the body 3 of the tip assembly 1 when brought into alignment therewith. The outer end of the locking lever 22 may be spring biased radially inwardly by a spring (not shown). During insertion of the tip 5 into the pole adaptor socket 21, as long as the locking pin 28 is in axial alignment with the hole 30 in the tip assembly body 3, the locking pin will ride up over a ramp 32 on the adjacent end surface of the tip assembly body 3 and snap into the aligned hole 30, thereby locking the tip assembly to the extension pole/handle extension.

When the tip assembly 1 is connected to the pole adaptor 14 using the tip 5 with thread segments 7, the other tip 6 may be used to connect the extension pole 18 to tool handles having compatible quick release lock mechanisms of any suitable type including, for example, any of the types disclosed in U.S. Pat. No. 5,288,161, the entire disclosure of which is incorporated herein by reference. Once the tip 6 is fully seated within a tool handle socket with compatible quick release lock mechanism, the tool handle and tip assembly may be retained together using a suitable latch member such as a locking lever 34 pivotally attached to the tip assembly body 3 and a lock pin 36 on the outer end of the locking lever that fits into a mating hole or recess in the tool handle (not shown) until released by the operator pressing down on the lever thumb engaging portion 37 to disengage the lock pin from the hole and pulling the tip 6 out of the tool handle socket. The outer end of the locking lever 34 where the locking pin 36 is located extends axially outwardly beyond the non-cylindrical shaped flange 12 at the base of the tip 6.

Figure 4:
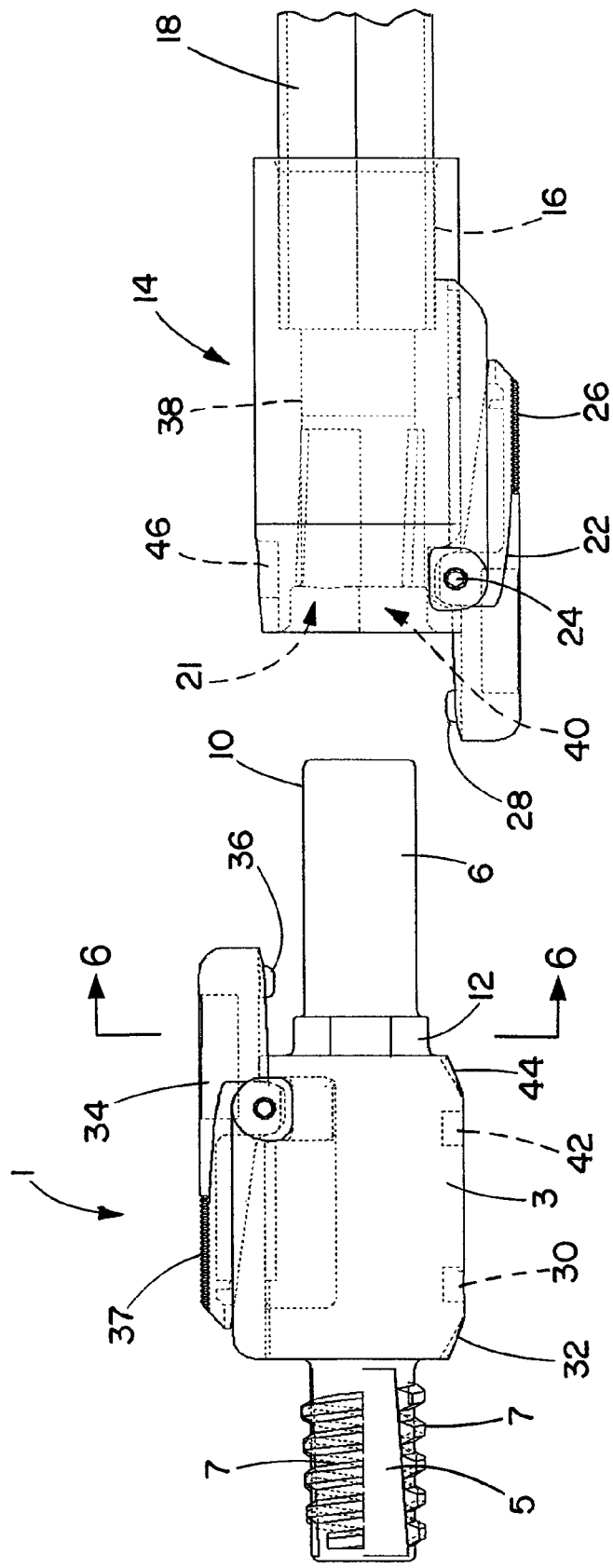
FIG. 4 is a side elevation view of the extension pole/handle extension with pole adaptor and reversible tip assembly of FIG. 1 but showing the tip assembly oriented for inserting the other tip into the pole adaptor socket.

The tip 6 with cylindrical outer end portion 10 may also be fitted snugly within the socket 21 in the pole adaptor 14 when aligned therewith as shown in FIGS. 4-6 for engagement of the cylindrical outer end portion with a bearing support 38 adjacent the axial inner end of the socket 21 and retained against relative rotation therebetween when fully inserted therein by seated engagement of the non-cylindrical flange 12 at the base of the tip in a correspondingly shaped recess 40 at the outer end of the pole adaptor socket. During insertion of the tip 6 into the pole adaptor socket 21, as long as the locking pin 28 on the pole adaptor locking lever 22 is in axial alignment with another hole or recess 42 in the tip assembly body 3, the locking pin will ride up over another ramp 44 at that end of the tip assembly body and snap into the aligned hole, thereby locking the tip assembly 1 to the extension pole 18. A slot 46 may be provided in the outer surface of the pole adaptor 14 in alignment with the locking lever 34 on the exterior of the tip body 3 for receipt of the outer end of the locking lever 34 and associated pin 36 during insertion of the tip 6 into the pole adaptor socket.

When the tip assembly 1 is connected to the pole adaptor 14 using the tip 6, the tip 5 with thread segments 7 may be used to threadedly connect the extension pole/handle extension to any tool handle having a conventional internally threaded socket with which the thread segments are compatible.

To remove the tip assembly 1 from the pole adaptor 14 when connected thereto by the tip 6, all the operator need do is press down on the thumb engaging portion 26 of the locking lever 22 to disengage the locking pin 28 from the hole 42 in the tip assembly body 3 and pull the tip assembly out of the pole adaptor as before.

Although the invention has been shown and described with respect to a certain embodiment, it is obvious that equivalent alterations and modifications will occur to other skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A reversible tip assembly for selectively connecting an extension pole/handle extension to tool handles having either compatible quick release lock mechanisms or conventional internally threaded sockets, the tip assembly comprising a body having oppositely extending rod-like tips at opposite ends of the body, one of the tips having a plurality of circumferentially spaced axially extending external thread segments, and the other tip having a cylindrical outer end portion that is compatible with the quick release lock mechanisms and a non-cylindrical shaped flange at an inner end of the other tip, and a locking lever pivotally connected to the body of the tip assembly, the locking lever having an outer end that extends axially outwardly beyond the non-cylincrical shaped flange at the inner end of the other tip, and a pin at the outer end of the locking lever.

2. An extension pole/handle extension and reversible tip assembly for selectively connecting the extension pole/handle extension to tool handles having either quick release lock mechanisms or conventional internally threaded sockets, the reversible tip assembly comprising a body having oppositely extending rod-like tips at opposite ends of the body, one of the tips having a plurality of circumferentially spaced axially extending thread segments, and the other tip having a cylindrical outer end portion and a non-cylindrical shaped flange at an inner end of the other tip, and the extension pole/handle extension having a pole adaptor fixedly attached to an end of the extension pole/handle extension, the pole adaptor having a socket in which either the one tip or the other tip is alternatively selectively insertable, the pole adaptor socket containing axially extending pockets in which the thread segments of the one tip are selectively fitted when inserted therein to prevent relative rotation therebetween, and the cylindrical outer end portion of the other tip is selectively fitted into a bearing support within the pole adaptor socket when inserted therein and retained against relative rotation therebetween by the non-cylindrical flange at the inner end of the other tip when seated in a correspondingly shaped recess at an outer end of the pole adaptor socket.

3. The extension pole/handle extension and reversible tip assembly of claim 2 further comprising a releasable latch for preventing whichever of the one tip or the other tip is selectively fitted within the pole adaptor socket from being withdrawn therefrom until released.

4. The extension pole/handle extension and reversible tip assembly of claim 2 further comprising a first latch member on the pole adaptor for releasably retaining the reversible tip assembly and the pole adaptor together irrespective of whichever of the one tip or the other tip is selectively fitted within the pole adaptor socket.

5. The extension pole/handle extension and reversible tip assembly of claim 4 wherein the first latch member comprises a first locking lever having inner and outer ends, the first locking lever being pivotally connected to the pole adaptor intermediate its ends with the outer end of the first locking lever extending beyond an outer end of the pole adaptor, and a first locking pin extends radially inwardly from the outer end of the first locking lever for pivotal movement with the first locking lever into and out of engagement with respective different holes or recesses in the reversible tip assembly body when the one tip or the other tip is selectively fitted within the pole adaptor socket and the first locking pin is brought into alignment with the respective different holes or recesses to releasably retain the tip assembly and pole adaptor together.

6. The extension pole/handle extension and reversible tip assembly of claim 5 further comprising a second latch member comprising a second locking lever having inner and outer ends, the second locking lever being pivotally connected to the reversible tip assembly body intermediate its ends with the inner end of the second locking lever extending beyond the non-cylindrical flange at the inner end of the other tip, and a second locking pin extends radially inwardly from the inner end of the second locking lever for pivotal movement with the second locking lever.

7. The extension pole/handle extension and reversible tip assembly of claim 6 further comprising a slot in the pole adaptor in alignment with the second locking lever on the reversible tip assembly body for receipt of the outer end of the second locking lever and associated second locking pin during insertion of the one tip into the pole adaptor socket.

\* \* \* \* \*